Nov. 27, 1951     E. L. BUSH     2,576,824
WHEEL SUSPENSION FOR TRAILERS
Filed Feb. 21, 1947     3 Sheets-Sheet 1

INVENTOR.
EAN LEE BUSH
BY George B. White
ATTORNEY

Nov. 27, 1951 E. L. BUSH 2,576,824
WHEEL SUSPENSION FOR TRAILERS
Filed Feb. 21, 1947 3 Sheets-Sheet 2
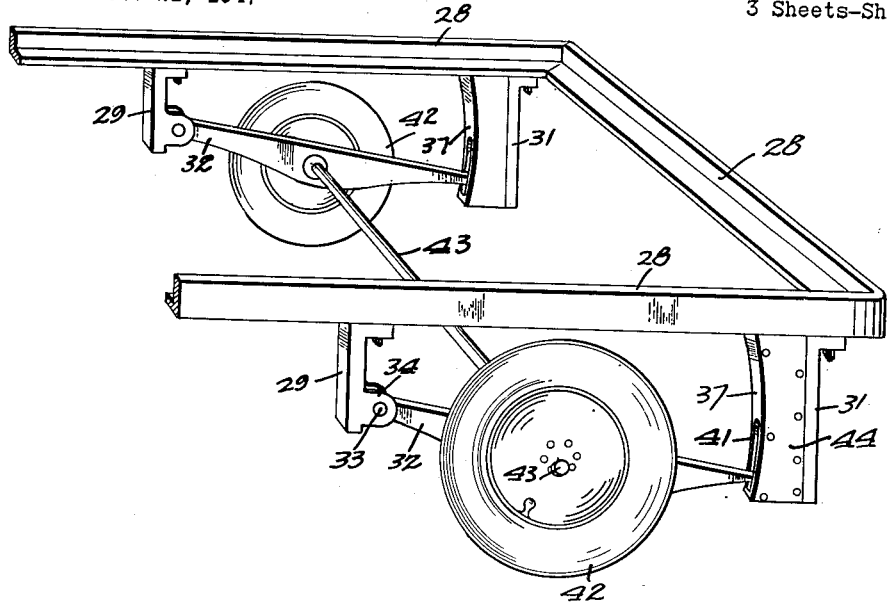
FIG. 5
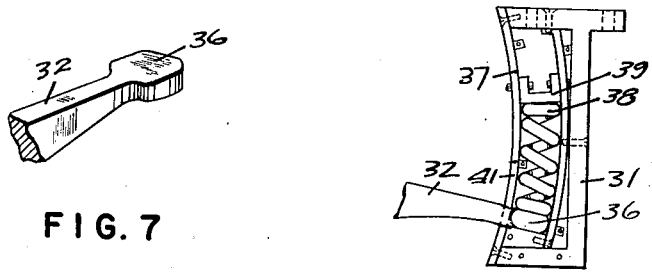
FIG. 7
FIG. 6
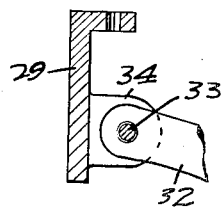
FIG. 8
INVENTOR
EAN LEE BUSH
BY George B White
ATTORNEY

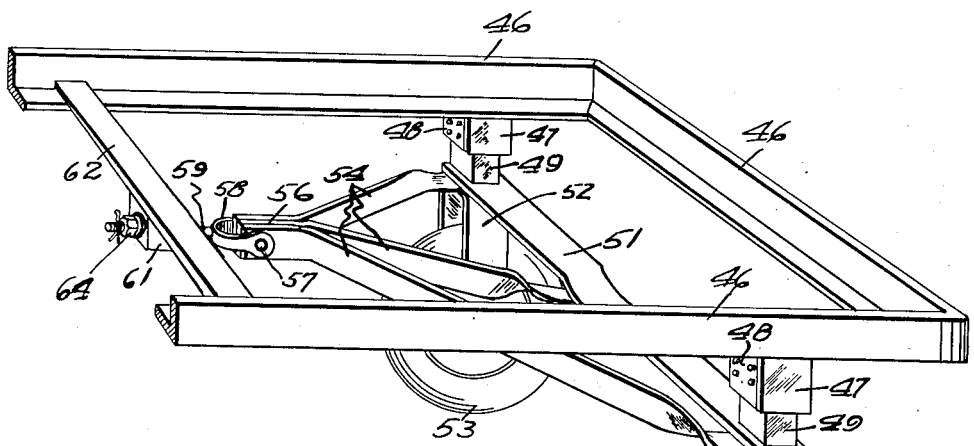
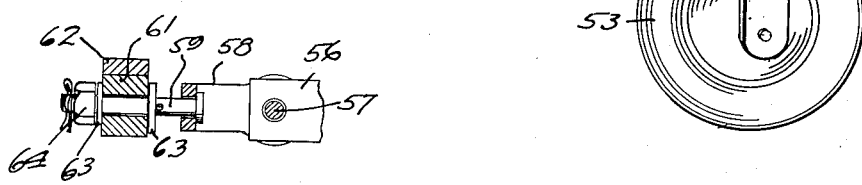
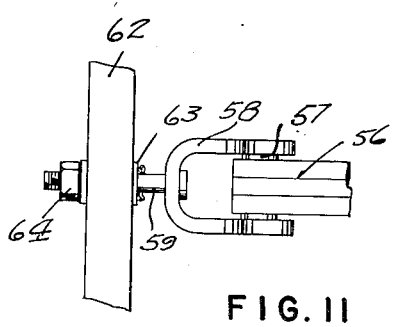
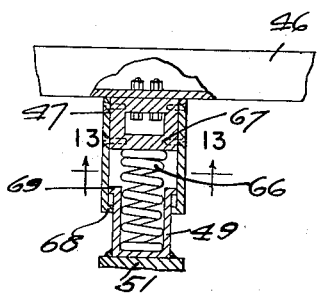
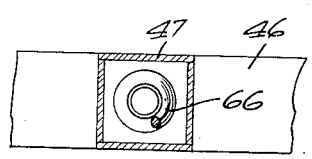

Patented Nov. 27, 1951

UNITED STATES PATENT OFFICE 2,576,824

WHEEL SUSPENSION FOR TRAILERS

Ean Lee Bush, San Francisco, Calif.

Application February 21, 1947, Serial No. 730,062

2 Claims. (Cl. 267—20)

This invention relates to wheel suspension for trailers and the like.

The primary object of the invention is to provide an adjustable support for the wheels of a trailer or the like comparatively light structure, wherein the respective wheels are allowed to conform to unevenness on the road and result in a smooth level riding of the trailer.

The features of my invention include: the supporting of the wheel on an element pivoted at one end and resiliently held in position at the other end so as to allow the swinging of the element with the wheel and thereby allow self-adjustment of the wheel to unevenness of the road; another feature is the supporting of this element on the frame of the vehicle or trailer in such a way as to allow the adjustment of the wheels together or separately and to operate both as a shock absorber and a self-adjustment for unevenness on the road; another feature of the invention is to provide for a simple mounting for the wheels whereby in certain instances universal adjustment of the wheel in accordance with unevenness of the road is obtainable; another feature of the invention is the provision of wheel support which is simple in construction and can be readily mounted on and applied to the frame of a trailer or the like.

Another object of this invention is to provide a wheel suspension for trailers or the like which is highly useful and simple in construction. Convenience of arrangement, lightness and comparative inexpensiveness are further objects which have been borne in mind in the production and development of the invention.

The essential features of the invention involved in the carrying out of the objects indicated are susceptible to modification, but a preferred embodiment of the invention is shown in the accompanying drawings, in which:

Fig. 5 is a perspective view of another form of the adjustable wheel suspension on a frame;

Fig. 6 is a fragmental detail view showing the resilient mounting of the wheel suspension;

Fig. 7 is a detail view of the end of the pivoted arm for the wheel suspension;

Fig. 8 is a sectional fragmental view showing the pivoted end of said suspension arm;

Fig. 9 is a perspective view of another modified form of the wheel suspension on a frame;

Fig. 10 is a sectional view of the pivoted end of the suspension arm of said second modified form;

Fig. 11 is a plan view of the pivoted end of said suspension rod in said second modified form;

Fig. 12 is a sectional view of the resilient mounting of the wheels in said second modified form; and, Fig. 13 is a sectional view of said suspension, taken on the lines 13—13 of Fig. 12.

Figure 1:
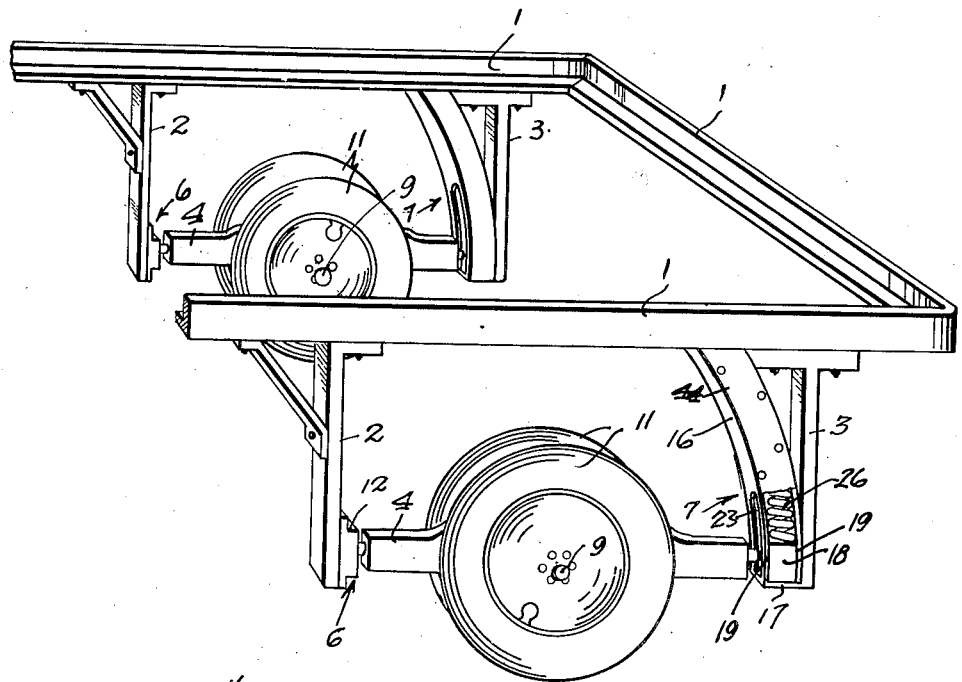
Fig. 1 is a perspective view of one form of wheel suspension as applied to the frame of a trailer.
Figure 3:
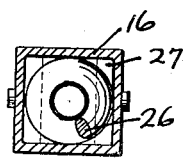
Fig. 3 is a sectional view of the resilient mounting, the section being taken on lines 3—3 of Fig. 2.
Figure 2:
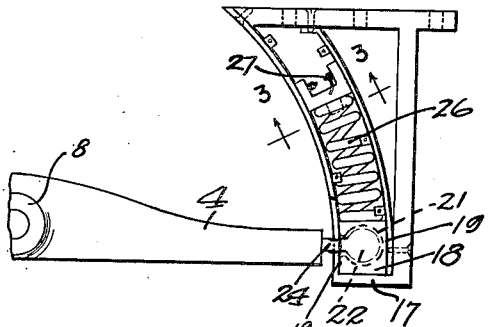
Fig. 2 is a fragmental detail view, partly in section, showing the resilient mounting of an end of the wheel support.
Figure 4:
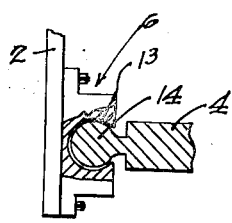
Fig. 4 is a sectional detail view of the universal mounting of the pivoted end of the wheel suspension arm.

In the form of the invention shown in Figs. 1 to 4 inclusive, the frame of the trailer or the vehicle is indicated by the frame members 1. Spaced brackets 2 and 3 extend from each side of the frame 1. A wheel supporting arm 4 is swingably supported at 6 at one end thereof and is resiliently shiftable in a spring holding device 7 at the other end thereof. Substantially intermediate between the ends of the suspending arm 4 is provided a suitable bearing 8 in which is held the axle or shaft 9 of the wheel 11. In the present illustration in this form the wheels are so-called double wheels in which a wheel and tire is mounted on each side of the bearing 8 of the arm 4. The supporting joint 6 at the pivoted end of the arm 4 is a suitable construction for universal adjustment of the arm namely to allow the turning of the arm around its axis as well as the downward and upward movement of the other end of the arm around said pivot. In this form the pivot joint 6 is a suitable ball and socket joint. A retainer 12 with a spherical socket 13 therein is mounted on the bracket 2 preferably at the end of the arm 4 in the direction of forward movement of the vehicle. In this spherical socket 13 is held a ball 14 which is fixed on the pivoted end of the arm 4 as shown in Fig. 4.

The resiliency of the movement of the arm 4 is accomplished by the resilient guide and supporting device 7 on the other bracket 3. In this illustrative embodiment this includes an arcuate tube 16 which extends from a bottom shelf 17 of the bracket 3 upwardly to the frame 1 and is suitably secured in place. In the present illustration this guide tube 16 is of rectangular cross-section on its inside passage. Inside of this tube and resting on the shelf 17 is a traveling block 18 which slidably fits in the tube having opposite arcuate sides 19 corresponding to the curvature of the guide 16. This traveling block 18 has therein a spherical socket 21 to hold the pivot ball 22 which latter is secured to the movable arm 4. In order to provide for the swinging movement of the arm 4 and of its outer end, a slot 23 is provided on the side of the guide 16 facing toward the arm 4 in which slot a reduced stem 24 of said ball 22 slides during the up and down movement of the arm 4. A coil spring 26 in the tube 16 bears at one end against an abutment 27 in said tube 16 and at the farther end against the top of the traveling block 18 so as to resiliently yieldably urge the block 18 downwardly and thus resiliently hold the movable end of the arm 4 in the downward position, and urge the wheel to the road.

In operation as the trailer travels and any unevenness occurs on either side, the wheel 11 riding thereover is pushed upwardly against the action of the coil spring 26 so that the arm 4 pivots upwardly around the pivot joint 6, and thereby compensates for the difference of the level under the opposed sets of wheels 11. In the event there is an unevenness between the two tires or wheels of each set of wheels 11, then the ball and socket joints at the opposite ends of the arm 4 allow a turning movement of the wheels and of the arm 4 around the axis of the arm 4 and around said ball and socket joint so as to compensate for any such angular displacement. This provides for a universal adjustment of the wheels 11 relative to one another on the trailer so as to maintain the trailer at a level riding attitude over uneven roads or other surfaces.

In the modified form of the support shown in Figs. 5 to 8 inclusive, the vehicle or trailer frame 28 is indicated by three frame members. Spaced brackets 29 and 31 extend downwardly from each side of the frame 28. The bracket 29 in the forward direction with respect to the vehicle is shorter than the bracket 31 so that a suspension arm 32 is supported initially in a rearwardly and downwardly inclined position as shown. The forward and higher end of the suspension arm 32 is pivoted on a pivot 33 in bearings 34 on the forward bracket 29. The rear and lower end of the arm 32 has thereon an enlarged widened head 36 as particularly shown in Fig. 7. This head 36 rides in an arcuate guide 37 substantially of the type heretofore described. This guide has therein a coil spring 38 which bears at its upper end against a fixed abutment 39 in the guide 37, and at its other end downwardly against the head 36 on the rearward end of the suspension arm 32. A slot 41 on the face of the guide 37 opposite the suspension arm 32 allows the sliding of said arm up and down during the adjustment of the wheel 42 which is rotatably mounted substantially intermediate the suspension arm 32 on an axle 43, which latter in this form extends between the opposite wheels and the opposite sides of the frame 28.

In this modified form of the invention, the adjustment and compensation is made only by upward and downward motion, the suspension arm 32 is not universally adjustable. The pivoting of the suspension arm 32 on the pivot 33 of its forward end allows the raising and lowering of the wheels 42 so as to compensate for unevenness of the road and assure sure smooth riding. In both of the heretofore described forms, the respective guides 16 and 37 have a removable side plate 44 thereon for facilitating the assembly of the springs and of the respective ends of the respective suspension arms.

In the second modified embodiment of my invention shown in Figs. 9 to 13 inclusive, the trailer frame is indicated by the frame members 46. From each side frame member 46 extends downwardly a bracket 47, the lower portion of which is hollow. One side 48 of each bracket 47 is removable for purposes of assembly. Inside of this bracket 47 telescopes a slidable hollow projection 49 which extends upwardly from a cross arm 51. There is one such telescopic support at each end of the cross arm 51. From each end of the cross arm 51 extends downwardly a bearing bracket 52 between the arms of which latter is suitably journalled a wheel 53.

From the opposite ends and from the center of said cross arm 51 extend radius bars 54 which converge forwardly of the vehicle into a hub 56. This hub 56 is pivoted on a transverse horizontal pivot 57 in a yoke 58. The stem 59 of said yoke 58 in turn is rotatably supported in a bearing bracket 61 mounted on a cross member 62 of said frame 46. The yoke stem 59 has thereon a collar 63 which engages a face of the bearing bracket 61 and is held in place by a suitable nut 64. In this manner the yoke is journalled around an axis substantially longitudinal with respect to the vehicle, or at right angles to the cross arm 51.

In each telescoping support is a coil spring 66 which engages at the top an abutment 67 in the bracket 47 and at the bottom the base of the projection 49 so as to normally urge the ends of the arm 51 and the respective wheels 53 downwardly. The lower end of each bracket 47 has an inwardly turned flange 68 all around which is engaged by an outwardly turned flange 69 on the movable projection 49 so as to limit the outward telescopic movement of said projection.

In operation the wheels 53 can adjust themselves individually upwardly and the turning movement of the cross arm 51 is compensated for and transmitted by the radius bars 54 to the yoke 58 and its universal support. Thus, the two wheels are connected through the cross arm 51 and are yieldably held on the frame of the vehicle, but are universally adjustable around the support of the forward ends of the radius bars 54.

I claim:

1. A wheel suspension for a vehicle frame, comprising a pair of brackets extended downwardly from a side of the frame of the vehicle, a suspension arm to rotatably support a wheel, universal pivoting connecting means between one of said brackets and said arm, an arcuate guide tube on the other bracket, a traveling block in said guide universally connected to the other end of said arm for vertical displacement, and resiliently yieldable means in said guide to normally urge said block and said arm and said wheel therewith downwardly.

2. In a wheel suspension for a vehicle frame, spaced bracket elements on a side of said vehicle, a suspension arm adapted to rotatably support a wheel, pivotal connecting means between one end of said arm and one of said bracket elements, a guide on the other bracket element adjacent the other end of said arm, a traveling block on said other end of said arm adapted to travel in said guide, and a spring in said guide normally urging said traveling block and said end of said arm downwardly, said pivotal connecting means including a universal joint and a universal joint between said traveling block and the adjacent end of said arm.

EAN LEE BUSH.

REFERENCES CITED

The following references are of record in the file of this patent:

UNITED STATES PATENTS

| Number | Name | Date |
| --- | --- | --- |
| 2,059,963 | Barrows | Nov. 3, 1936 |
| 2,075,585 | Martin | Mar. 30, 1937 |
| 2,181,546 | Bradshaw | Nov. 28, 1939 |
| 2,336,814 | Suter | Dec. 14, 1943 |
| 2,453,117 | Buckendale | Nov. 9, 1948 |

FOREIGN PATENTS

| Number | Country | Date |
| --- | --- | --- |
| 717,502 | France | Oct. 20, 1931 |
| 825,247 | France | Nov. 27, 1937 |